(12) United States Patent
Ghoshal et al.

(10) Patent No.: US 12,520,112 B2
(45) Date of Patent: Jan. 6, 2026

(54) PROXIMITY-BASED MODEL FOR INDOOR LOCALIZATION USING WIRELESS SIGNALS

(71) Applicant: Aerial Technologies Inc., Montreal (CA)

(72) Inventors: Debarshi Patanjali Ghoshal, Montreal (CA); Negar Ghourchian, Montreal (CA); Michel Allegue Martinez, Terrebonne (CA)

(73) Assignee: AERIAL TECHNOLOGIES INC., Montreal (CA)

( * ) Notice: Subject to any disclaimer, the term of this patent is extended or adjusted under 35 U.S.C. 154(b) by 361 days.

(21) Appl. No.: 17/524,024

(22) Filed: Nov. 11, 2021

(65) Prior Publication Data

US 2022/0070633 A1 Mar. 3, 2022

Related U.S. Application Data

(63) Continuation of application No. PCT/IB2020/055186, filed on Jun. 2, 2020.
(Continued)

(51) Int. Cl.
*H04W 4/33* (2018.01)
*H04W 4/029* (2018.01)

(52) U.S. Cl.
CPC ............. *H04W 4/33* (2018.02); *H04W 4/029* (2018.02)

(58) Field of Classification Search
CPC ....... H04W 4/33; H04W 4/029; H04W 4/021; H04W 4/023; H04L 67/30; G01V 3/12
See application file for complete search history.

(56) References Cited

U.S. PATENT DOCUMENTS 8,073,441 B1 12/2011 Unger et al.
8,461,988 B2 6/2013 Tran
(Continued)

FOREIGN PATENT DOCUMENTS

CA 3044480 5/2018
CN 105828289 8/2016
(Continued)

OTHER PUBLICATIONS

Deng et al., "CC-DTW: An Accurate Indoor Fingerprinting Localization Using Calibrated Channel State Information and Modified Dynamic Time Warping", Sensors 19, No. 9: 1984, Apr. 28, 2019 (Apr. 28, 2019), [online] [retrieved on Aug. 20, 2020 (Aug. 20, 2020)], Retrieved from the internet: https://www.mdpif.com/1424-8220/19/9/1984.

(Continued)

*Primary Examiner* — Fred A Casca
(74) *Attorney, Agent, or Firm* — Rosenberg, Klein & Lee

(57) ABSTRACT

Systems and methods of using wireless signals to create a sensing infrastructure for tracking the location of a moving subject within residential or industrial indoor environments are provided. The changes and disruptions of wireless signals transmitted and received by a plurality of wireless devices are collected and analyzed to infer the position of a moving participant within a sensing area. More particularly, a proximity-based method that models and estimates the location of a moving participant within the sensing area with respect to a single or plurality of fixed position(s) of wireless devices is provided.

5 Claims, 14 Drawing Sheets

Related U.S. Application Data

Figure 1:
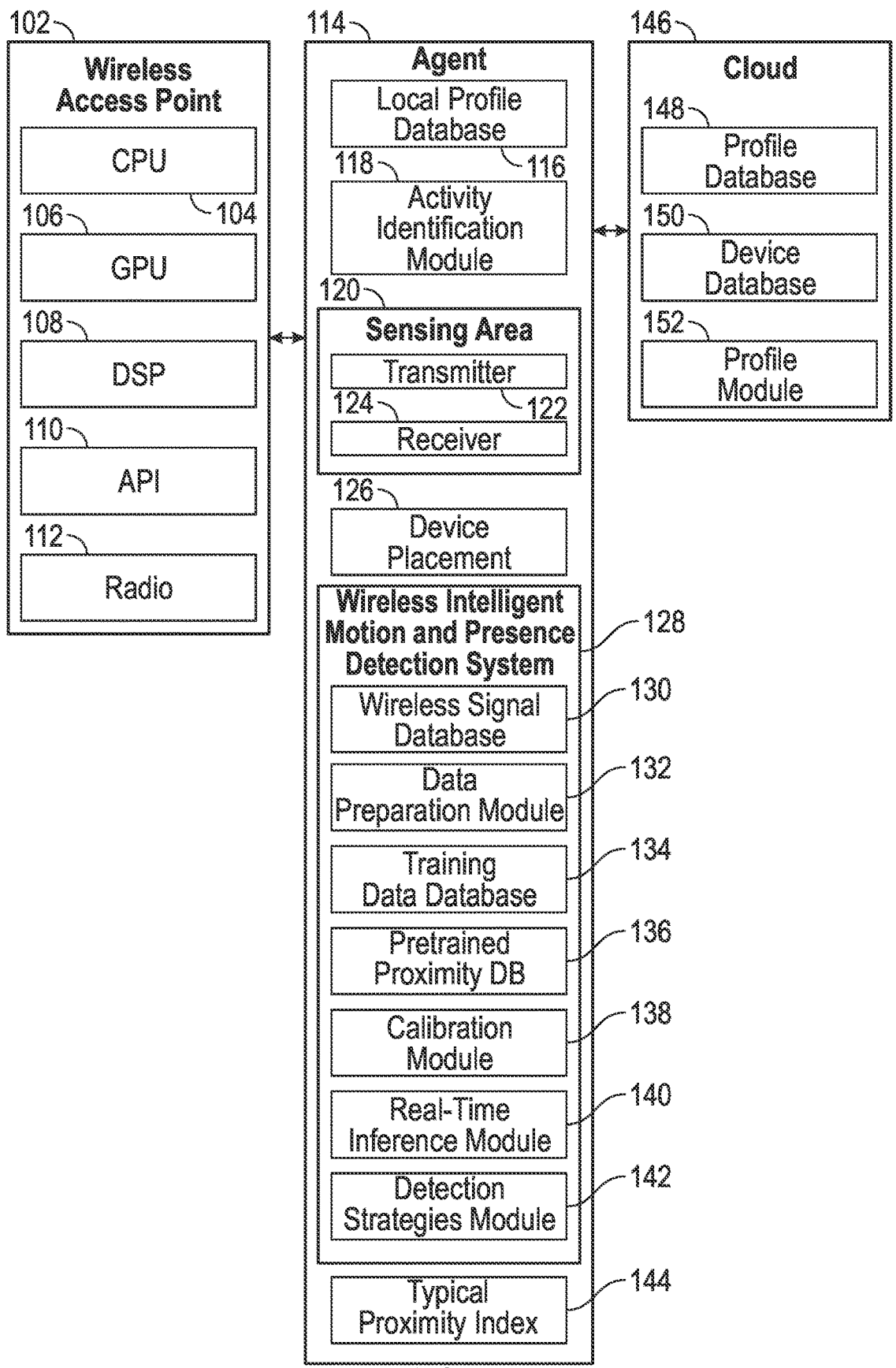

(60) Provisional application No. 62/854,704, filed on May 30, 2019.

(56) References Cited

U.S. PATENT DOCUMENTS

| | | |
|---|---|---|
| 8,864,663 B1 | 10/2014 | Kahn |
| 9,219,790 B1 | 12/2015 | Filev et al. |
| 9,414,115 B1 | 8/2016 | Mao et al. |
| 9,703,892 B2 | 7/2017 | Ramer et al. |
| 9,854,292 B1 | 12/2017 | Matthews et al. |
| 9,867,548 B2 | 1/2018 | Le et al. |
| 9,985,846 B1 | 5/2018 | Roman et al. |
| 10,045,191 B2 | 8/2018 | Nguyen et al. |
| 10,374,646 B1 | 8/2019 | Fletcher |
| 10,419,880 B1 | 9/2019 | Long et al. |
| 10,818,384 B1 | 10/2020 | Peterson et al. |
| 10,999,705 B2 | 5/2021 | Martinez et al. |
| 11,017,688 B1 | 5/2021 | Arazi |
| 11,039,278 B1 | 6/2021 | Carreiro et al. |
| 11,082,109 B2 | 8/2021 | Martinez et al. |
| 11,218,769 B2 | 1/2022 | Martinez |
| 11,448,726 B2 | 9/2022 | Martinez |
| 11,523,253 B2 | 12/2022 | Martinez |
| 11,586,952 B2 | 2/2023 | Martinez |
| 11,593,837 B2 | 2/2023 | Martinez |
| 11,611,382 B2 | 3/2023 | Martinez |
| 2002/0188668 A1 | 12/2002 | Jeffery et al. |
| 2006/0224938 A1 | 10/2006 | Fikes et al. |
| 2007/0024580 A1 | 2/2007 | Sands et al. |
| 2007/0266395 A1 | 11/2007 | Lee et al. |
| 2008/0262909 A1 | 10/2008 | Li et al. |
| 2010/0242063 A1 | 9/2010 | Slaney et al. |
| 2011/0029277 A1 | 2/2011 | Chowdhary et al. |
| 2011/0117924 A1 | 5/2011 | Brunner et al. |
| 2011/0129047 A1 | 6/2011 | Mashino et al. |
| 2011/0258039 A1 | 10/2011 | Patwa et al. |
| 2012/0053472 A1 | 3/2012 | Tran |
| 2012/0135733 A1 | 5/2012 | Cormier et al. |
| 2012/0289147 A1 | 11/2012 | Raleigh et al. |
| 2012/0324494 A1 | 12/2012 | Burger et al. |
| 2013/0014136 A1 | 1/2013 | Bhatia et al. |
| 2013/0028443 A1 | 1/2013 | Pance et al. |
| 2013/0053990 A1 | 2/2013 | Ackland |
| 2013/0076528 A1 | 3/2013 | Boettner |
| 2013/0102256 A1 | 4/2013 | Cendrillon et al. |
| 2013/0115974 A1 | 5/2013 | Lee et al. |
| 2013/0281122 A1* | 10/2013 | Zelinka ............... G01S 5/0242 455/456.3 |
| 2013/0326554 A1 | 12/2013 | Shkedi |
| 2014/0033240 A1 | 1/2014 | Card et al. |
| 2014/0181100 A1 | 6/2014 | Ramer et al. |
| 2014/0223467 A1 | 8/2014 | Hayton et al. |
| 2014/0278389 A1 | 9/2014 | Zurek et al. |
| 2014/0358012 A1 | 12/2014 | Richards et al. |
| 2015/0026708 A1 | 1/2015 | Ahmed et al. |
| 2015/0050923 A1 | 2/2015 | Tu et al. |
| 2015/0092747 A1 | 4/2015 | Ganesan |
| 2015/0110471 A1 | 4/2015 | Zheng |
| 2015/0113556 A1 | 4/2015 | Weast et al. |
| 2015/0121428 A1 | 4/2015 | Nguyen et al. |
| 2015/0365787 A1 | 12/2015 | Farrell |
| 2016/0057472 A1 | 2/2016 | Gupta et al. |
| 2016/0105700 A1 | 4/2016 | Collins et al. |
| 2016/0127766 A1 | 5/2016 | Luk et al. |
| 2016/0174185 A1 | 6/2016 | Ramakrishnan et al. |
| 2016/0253710 A1 | 9/2016 | Publicover et al. |
| 2016/0277529 A1 | 9/2016 | Vhrn et al. |
| 2016/0315682 A1 | 10/2016 | Liu et al. |
| 2016/0337701 A1 | 11/2016 | Khare et al. |
| 2016/0344779 A1 | 11/2016 | Jain et al. |
| 2017/0032191 A1 | 2/2017 | Ackland |
| 2017/0068790 A1 | 3/2017 | Fuerst |
| 2017/0135635 A1 | 5/2017 | Bostick et al. |
| 2017/0160089 A1 | 6/2017 | Jang et al. |
| 2017/0293729 A1 | 10/2017 | Movva |
| 2017/0300970 A1* | 10/2017 | Yoder ............... G06Q 30/0259 |
| 2017/0315711 A1 | 11/2017 | Adams |
| 2017/0332192 A1 | 11/2017 | Edge |
| 2017/0354349 A1 | 12/2017 | Mohaptra et al. |
| 2017/0366955 A1 | 12/2017 | Edge |
| 2018/0008207 A1 | 1/2018 | Sarkela et al. |
| 2018/0035072 A1 | 2/2018 | Asarikuniyil et al. |
| 2018/0091952 A1 | 3/2018 | Sant et al. |
| 2018/0181094 A1 | 6/2018 | Funk et al. |
| 2018/0184165 A1 | 6/2018 | Maughan et al. |
| 2018/0330406 A1 | 11/2018 | Deluca et al. |
| 2018/0366228 A1 | 12/2018 | Buck |
| 2019/0051342 A1 | 2/2019 | Wooton et al. |
| 2019/0174170 A1 | 6/2019 | Chen |
| 2019/0178980 A1 | 6/2019 | Zhang et al. |
| 2019/0188756 A1 | 6/2019 | Bradley et al. |
| 2019/0246371 A1 | 8/2019 | Hwang et al. |
| 2019/0252079 A1 | 8/2019 | Constantin et al. |
| 2019/0306023 A1 | 10/2019 | Vasseur et al. |
| 2020/0036592 A1 | 1/2020 | Kholaif |
| 2020/0053559 A1* | 2/2020 | Kim ............... G06F 18/24 |
| 2020/0090022 A1 | 3/2020 | Ma et al. |
| 2020/0112939 A1 | 4/2020 | Scharf et al. |
| 2020/0120384 A1 | 4/2020 | Armaly |
| 2020/0133383 A1 | 4/2020 | Ahlstrom et al. |
| 2020/0186321 A1 | 6/2020 | Hwang et al. |
| 2020/0226388 A1 | 7/2020 | Ghessassi |
| 2020/0265700 A1 | 8/2020 | Bergman et al. |
| 2020/0292572 A1 | 9/2020 | Bateni et al. |
| 2020/0302478 A1 | 9/2020 | Martinez |
| 2020/0303046 A1 | 9/2020 | Martinez et al. |
| 2020/0327430 A1 | 10/2020 | Martinez et al. |
| 2020/0383119 A1 | 12/2020 | Sun et al. |
| 2020/0397365 A1 | 12/2020 | Zhang et al. |
| 2021/0063537 A1 | 3/2021 | Martinez |
| 2021/0120370 A1 | 4/2021 | Martinez |
| 2021/0352441 A1 | 11/2021 | Liu |
| 2022/0060234 A1 | 2/2022 | Martinez et al. |
| 2022/0167050 A1 | 5/2022 | Martinez |
| 2022/0167305 A1* | 5/2022 | Yang ............... G01S 5/02524 |
| 2022/0256429 A1 | 8/2022 | Martinez |
| 2023/0003836 A1 | 1/2023 | Martinez |

FOREIGN PATENT DOCUMENTS

| | | |
|---|---|---|
| WO | WO 2016/187458 | 11/2016 |
| WO | WO 2018/094502 | 5/2018 |
| WO | WO 2020/170221 | 8/2020 |
| WO | WO 2020/240526 | 12/2020 |
| WO | WO 2021/084519 | 5/2021 |

OTHER PUBLICATIONS

Ghourchian et al., "Real-Time Indoor Localization in Smart Homes Using Semi-Supervised Learning", Association for the Advancement of Artificial Intelligence, Twenty-Ninth AAAI Conference on Innovative Applications, pp. 4670-4677, Feb. 8, 2017 (Feb. 8, 2017), [online] [retrieved on Aug. 20, 2020 (Aug. 20, 2020)], Retrieved from the internet: https://aaai.org/ocs/index.php/IAAI/IAAI17/paer/view/15010.

Rui Zhou et al., "Device-free Localization Based on CSI Fingerprints and Deep Neural Networks", 15 Annual IEEE International Conference on Sensing, Communication, and Networking (SECON), Jun. 11, 2018 (Jun. 11, 2018), [online] [retrieved on Aug. 20, 2020 (Aug. 20, 2020] Retrieved from the internet: https://dl.acm.org/doi/10.1145/2639108.2639143.

Xuyu Wang et al., "CSI-Based Fingerprinting for Indoor Localization: A Deep Learning Approach", IEEE Transactions on Vehicular Technology, vol. 66, No. 1, pp. 763-776, Mar. 22, 2016 (Mar. 22, 2016), [online] [retrieved on Aug. 20, 2020 (Aug. 20, 2020), Retrieved from the internet: https://ieeexplore://ieeexplore.ieee.org/documents/7438932.

Yang Wang et al., "E-eyes: Device-free Location-oriented Activity Identification Using Fine-grained Wifi Signatures", MobiCom'14,

(56) References Cited

OTHER PUBLICATIONS pp. 617-628 Sep. 7, 2014 (Sep. 7, 2014), [retrieved on Aug. 20, 2020 (Aug. 20, 2020)], Retrieved from the internet: https://dl.acm.org/doi/10.1145/2639108.2639143.
PCT Application No. PCT/IB2020/051503 International Preliminary Report on Patentability dated Aug. 10, 2021.
PCT Application No. PCT/IB2020/051503 International Search Report and Written Opinion dated Jul. 30, 2020.
PCT Application No. PCT/IB2020/055186 International Preliminary Report on Patentability dated Nov. 16, 2021.
PCT Application No. PCT/IB2020/055186 International Search Report and Written Opinion dated Oct. 15, 2020.
PCT Application No. PCT/IB2020/060271 International Search Report and Written Opinion dated Feb. 15, 2021.
U.S. Appl. No. 16/796,662 Office Action mailed Feb. 12, 2021.
U.S. Appl. No. 16/795,198 Office Action mailed Jan. 25, 2022.
U.S. Appl. No. 16/798,138 Office Action mailed Sep. 8, 2020.
U.S. Appl. No. 16/798,319 Office Action mailed Dec. 29, 2021.
U.S. Appl. 16/798,148 Office Action mailed Oct. 22, 2021.
U.S. Appl. No. 17/006,579 Office Action mailed Jan. 6, 2022.
U.S. Appl. No. 17/730,940, Michel A. Martinez, System for Multi-Path 5G and Wi-Fi Motion Detection, filed Apr. 27, 2022.
PCT Application No. PCT/IB2020/060271 International Preliminary Report on Patentability dated May 3, 2022.
U.S. Appl. No. 16/794,668 Office Action mailed May 24, 2022.
U.S. Appl. No. 16/798,319 Final Office Action mailed Jun. 13, 2022.
U.S. Appl. No. 16/798,148 Office Action mailed Jul. 26, 2022.
U.S. Appl. No. 17/539,872 Office Action mailed Jan. 5, 2023.
U.S. Appl. No. 16/798,148 Final Office Action mailed Jan. 3, 2023.
U.S. Appl. No. 16/798,319 Office Action mailed Mar. 7, 2023.
U.S. Appl. No. 17/902,070 Office Action mailed Mar. 31, 2023.
U.S. Appl. No. 17/539,872, Michel A. Martinez, Smart Media Display, filed Dec. 1, 2021.
U.S. Appl. No. 17/392,678, Michel A. Martinez, Self-Learning Based on Wi-Fi-Based Monitoring and Augmentation, filed Aug. 3, 2021.
Xi et al.; "Electronic Frog Eye: Counting Crowd Using WiFi", Department of Computer Science, Jul. 8, 2014.
Xu et al., "SCPL: Indoor Device-Free Multi-Subject Counting and Localization Using Radio Signal Strength", 2013.
U.S. Appl. No. 16/798,148 Final Office Action mailed Apr. 8, 2022.
U.S. Appl. No. 17/131,078 Non-Final Office Action mailed Mar. 2, 2022.
Deng et al.; "CC-DTW: An Accurate Indoor Fingerprinting Localization using Calibrated Channel State Information and Modified Dynamic Time Warping", Sensors, vol. 19, No. 9, pp. 1984 2019.
Ghourchain et al.; "Real Time Indoor Localization in Smart Homes using Semi-Supervised Learning", 29th AAAI Conference on Innovative Applications, pp. 4670-4677, 2017.
Zhou et al.; "Device Free Localization based on CSI Fingerprints and Deep Neural Networks", 15th IEEE Int. Conf. on Sensing, Communication and Networking, 2018.
Wang et al.; "CSI Based Fingerprinting for Indoor Localization: A Deep Learning Approach", IEEE Trans. Vehicular Technology, vol. 66, No. 1, pp. 763-776, 2016.
Wang et al.; "E-Eyes: Device-Free Localization-Orientated Activity Identification using Fine-Grained WIFI Signatures"; MobiCom'14, pp. 617-628, 2014.

\* cited by examiner

| Description | Direction from Transmitter | Angle (in Degrees Relative) | Speed | Number of Object | Proximity Index Waveform |
|---|---|---|---|---|---|
| Walking Away | Away | 0 | 1 | 1 | Proximityfile1.dat |
| Walking Away | Away | 1 | 1 | 1 | Proximityfile2.dat |
| Walking Away | Away | 2 | 1 | 1 | Proximityfile3.dat |
| ... | ... | ... | ... | ... | ... |
| Walking Away | Away | 10 | 1 | 1 | Proximityfile4.dat |
| Walking Away | Away | 11 | 1 | 1 | Proximityfile5.dat |
| ... | ... | ... | ... | ... | ... |
| Walking Away | Away | 90 | 1 | 1 | Proximityfile6.dat |
| Walking Towards | Towards | 0 | 1 | 1 | Proximityfile7.dat |
| Walking Towards | Towards | 1 | 1 | 1 | Proximityfile8.dat |
| Walking Towards | Towards | 2 | 1 | 1 | Proximityfile9.dat |
| ... | ... | ... | ... | ... | ... |
| Walking Towards | Towards | 10 | 1 | 1 | Proximityfile10.dat |
| Walking Towards | Towards | 11 | 1 | 1 | Proximityfile11.dat |
| ... | ... | ... | ... | ... | ... |
| Walking Towards | Towards | 90 | 1 | 1 | Proximityfile12.dat |
| Walking Away | Away | 0 | 5 | 1 | Proximityfile13.dat |
| Walking Away | Away | 1 | 5 | 1 | Proximityfile14.dat |
| Walking Away | Away | 2 | 5 | 1 | Proximityfile15.dat |
| ... | ... | ... | ... | ... | Proximityfile16.dat |
| (A) | (B) | (C) | (D) | (E) | (F) |

FIG. 6

| A | B | C | D | E | F |
|---|---|---|---|---|---|
| Walking Away | Away | 10 | 5 | 1 | Proximityfile18.dat |
| Walking Away | Away | 11 | 5 | 1 | Proximityfile19.dat |
| ... | ... | ... | ... | ... | ... |
| Walking Away | Away | 90 | 5 | 1 | Proximityfile20.dat |
| Walking Towards | Towards | 0 | 5 | 1 | Proximityfile21.dat |
| Walking Towards | Towards | 1 | 5 | 1 | Proximityfile22.dat |
| Walking Towards | Towards | 2 | 5 | 1 | Proximityfile23.dat |
| ... | ... | ... | ... | ... | ... |
| Walking Towards | Towards | 10 | 5 | 1 | Proximityfile24.dat |
| Walking Towards | Towards | 11 | 5 | 1 | Proximityfile25.dat |
| ... | ... | ... | ... | ... | Proximityfile26.dat |
| Walking Towards | Towards | 90 | 5 | 1 | Proximityfile27.dat |
| ... | ... | ... | ... | ... | ... |

FIG. 6
(Continued)

| Description | Direction from Transmitter | Angle (in Degrees) Relative to | Speed | Number of Object | Proximity Index Waveform | Proximity Index |
|---|---|---|---|---|---|---|
| Walking Away | Away | 0 | 1 | 1 | Proximityfile1.dat | 1 |
| Walking Away | Away | 1 | 1 | 1 | Proximityfile2.dat | 2 |
| Walking Away | Away | 2 | 1 | 1 | Proximityfile3.dat | 3 |
| ... | ... | ... | ... | ... | ... | ... |
| Walking Away | Away | 10 | 1 | 1 | Proximityfile4.dat | 4 |
| Walking Away | Away | 11 | 1 | 1 | Proximityfile5.dat | 5 |
| ... | ... | ... | ... | ... | ... | ... |
| Walking Away | Away | 90 | 1 | 1 | Proximityfile6.dat | 6 |
| Walking Towards | Towards | 0 | 1 | 1 | Proximityfile7.dat | 7 |
| Walking Towards | Towards | 1 | 1 | 1 | Proximityfile8.dat | 8 |
| Walking Towards | Towards | 2 | 1 | 1 | Proximityfile9.dat | 9 |
| ... | ... | ... | ... | ... | ... | ... |
| Walking Towards | Towards | 10 | 1 | 1 | Proximityfile10.dat | 10 |
| Walking Towards | Towards | 11 | 1 | 1 | Proximityfile11.dat | 11 |
| ... | ... | ... | ... | ... | ... | ... |
| Walking Towards | Towards | 90 | 1 | 1 | Proximityfile12.dat | 12 |
| Walking Away | Away | 0 | 5 | 1 | Proximityfile13.dat | 13 |
| Walking Away | Away | 1 | 5 | 1 | Proximityfile14.dat | 14 |
| Walking Away | Away | 2 | 5 | 1 | Proximityfile15.dat | 15 |
| ... | ... | ... | ... | ... | Proximityfile16.dat | 16 |
| ... | ... | ... | ... | ... | ... | ... |

FIG. 7

| A | B | C | D | E | F | G |
|---|---|---|---|---|---|---|
| Walking Away | Away | 10 | 5 | 1 | Proximityfile18.dat | 17 |
| Walking Away | Away | 11 | 5 | 1 | Proximityfile19.dat | 18 |
| ... | ... | ... | ... | ... | ... | ... |
| Walking Away | Away | 90 | 5 | 1 | Proximityfile20.dat | 19 |
| Walking Towards | Towards | 0 | 5 | 1 | Proximityfile21.dat | 20 |
| Walking Towards | Towards | 1 | 5 | 1 | Proximityfile22.dat | 21 |
| Walking Towards | Towards | 2 | 5 | 1 | Proximityfile23.dat | 22 |
| ... | ... | ... | ... | ... | ... | ... |
| Walking Towards | Towards | 10 | 5 | 1 | Proximityfile24.dat | 23 |
| Walking Towards | Towards | 11 | 5 | 1 | Proximityfile25.dat | 24 |
| ... | ... | ... | ... | ... | Proximityfile26.dat | 25 |
| Walking Towards | Towards | 90 | 5 | 1 | Proximityfile27.dat | 26 |
| ... | ... | ... | ... | ... | ... | ... |

FIG. 7
(Continued)

PROXIMITY-BASED MODEL FOR INDOOR LOCALIZATION USING WIRELESS SIGNALS

CROSS-REFERENCE TO RELATED APPLICATIONS

The present application is a continuation and claims the priority benefit of international application PCT/IB2020/055186 filed Jun. 2, 2020, which claims the priority benefit of U.S. provisional patent application 62/854,704 filed May 30, 2019, the disclosures of which are incorporated by reference in their entirety.

BACKGROUND OF THE INVENTION

1. Field of the Invention

The present disclosure is generally related to a system and method of using wireless signals to create an active sensing area and characterizing the disturbance of wireless signals. More specifically, the present disclosure is related to using wireless signals to track the location of a moving subject within residential or industrial indoor environments.

2. Description of the Related Art

Motion detection is the process of detecting a change in the position of an object relative to its surroundings or a change in the surroundings relative to an object. Motion detection is usually a software-based monitoring algorithm which, for example, when it detects motions will signal a surveillance camera to begin capturing an event. An advanced motion detection surveillance system can analyze the type of motion to see if it warrants an alarm.

Wi-Fi location determination, also known as Wi-Fi localization or Wi-Fi location estimation refers to methods of translating observed Wi-Fi signal strengths into locations. A "radio map," consists of sets of metadata containing information about the frequency response of the channel, and/or phase response of the channel, and/or impulse response of the channel, and/or received signal strength indicators (RSSI), and/or any other statistic that describes the wireless communication link between paired devices is stored as a "profile" to be compared later to a signal scan to recognize the location of the device doing the scanning.

Activity recognition is the problem of predicting or recognizing the movement of a person, often indoors, based on sensor data, such as an accelerometer in a smartphone or distortions of wireless signals. Activity recognition aims to recognize and predict the actions and goals of one or more agents from a series of observations on the agents' actions and the environmental conditions. Due to its multifaceted nature, different fields may refer to activity recognition as plan recognition, goal recognition, intent recognition, behavior recognition, location estimation and location-based services.

SUMMARY OF THE INVENTION

Embodiments of the present invention provide for detection of movement using wireless signals to create an active sensing area and characterizing the disturbance of wireless signals to track the location of a moving subject, which is the source of disturbances, within residential or industrial indoor environments. The location and proximity of a participant is determined by measuring changes in wireless signal data or channel state information data. A sensing area provides the wireless signal data to an intelligent motion sensing system which stores the wireless signal data in a wireless signal database. The wireless signal data is then processed by a data preparation module by applying a plurality of filters and algorithms. The processed data is stored in the training data database and used to develop a pre-trained proximity database for detecting location and proximity within the sensing area. A real-time inference module compares real-time wireless signal data to determine proximity and location of a participant within the sensing area, and a calibration module adjusts the pre-trained proximity database based on natural shifts in the wireless signal over time.

BRIEF DESCRIPTIONS OF THE DRAWINGS

Figure 2:
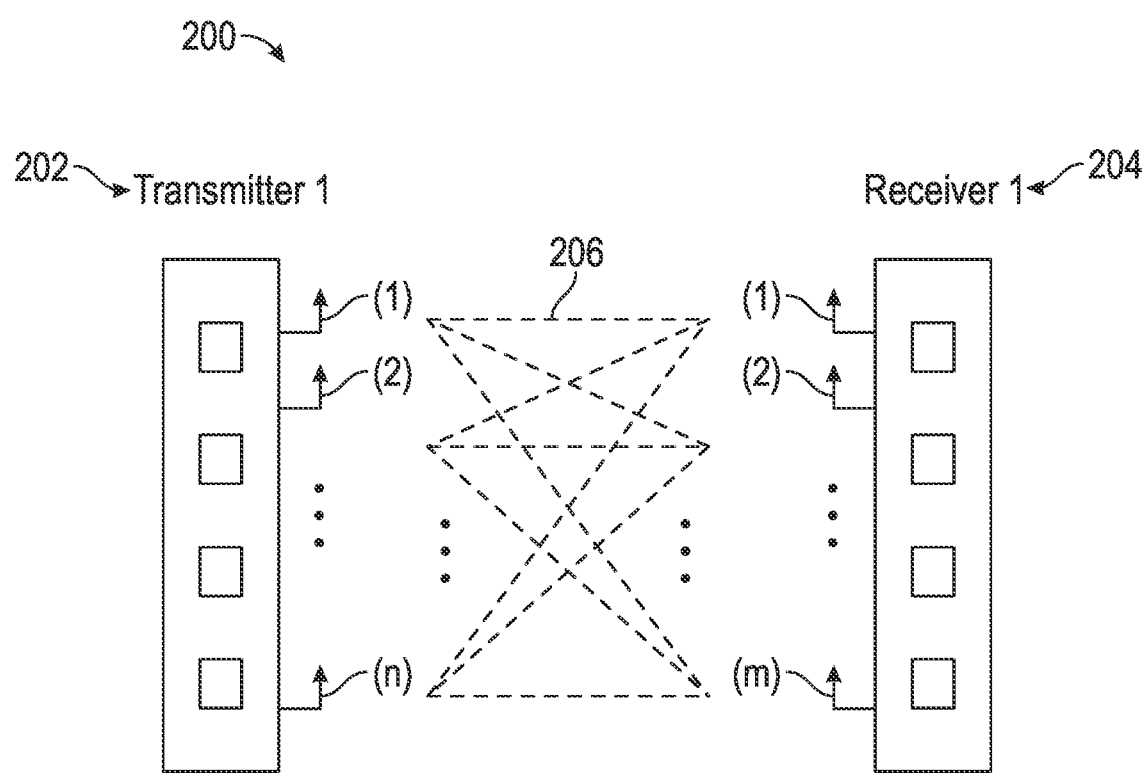
Figure 3:
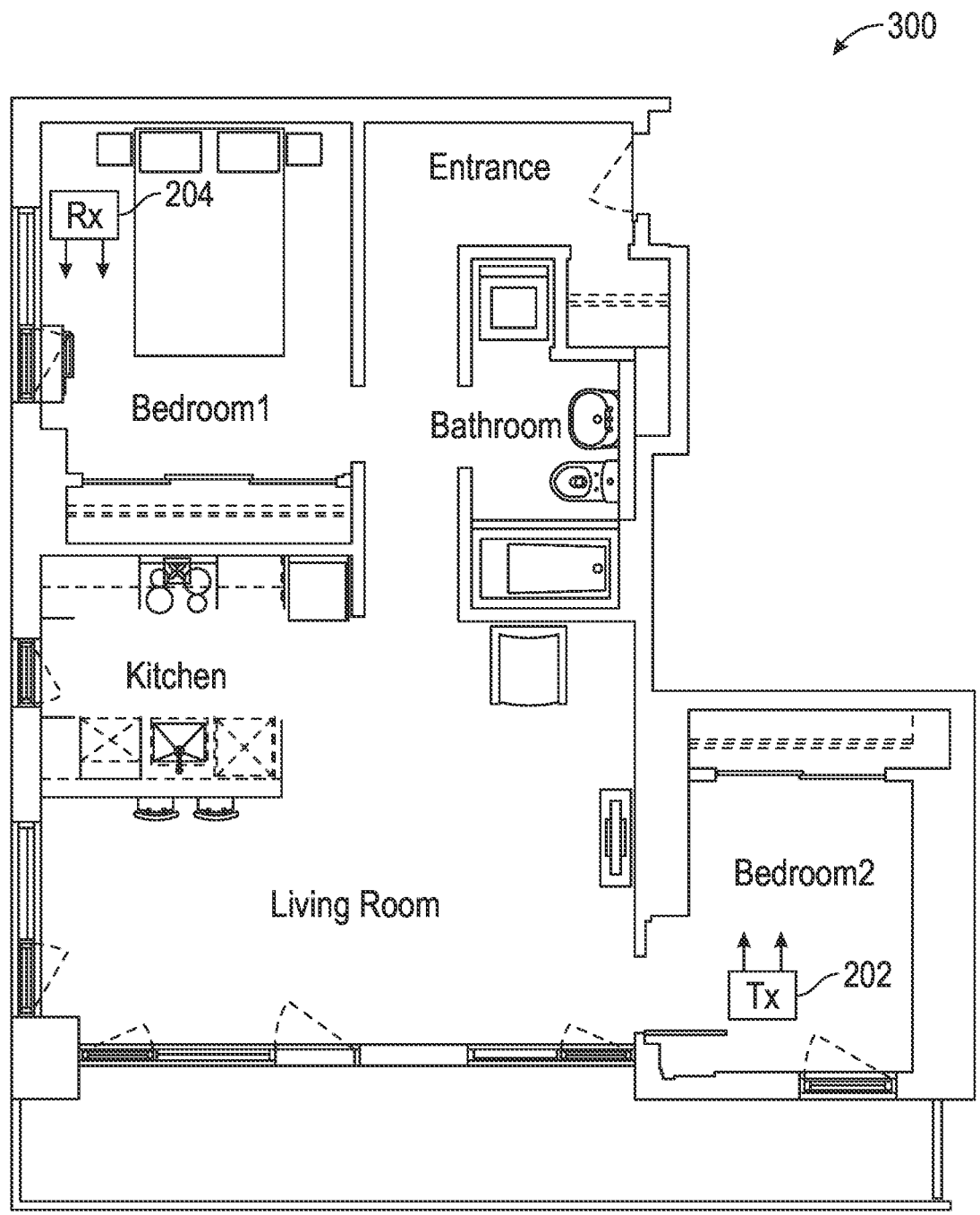
Figure 4:
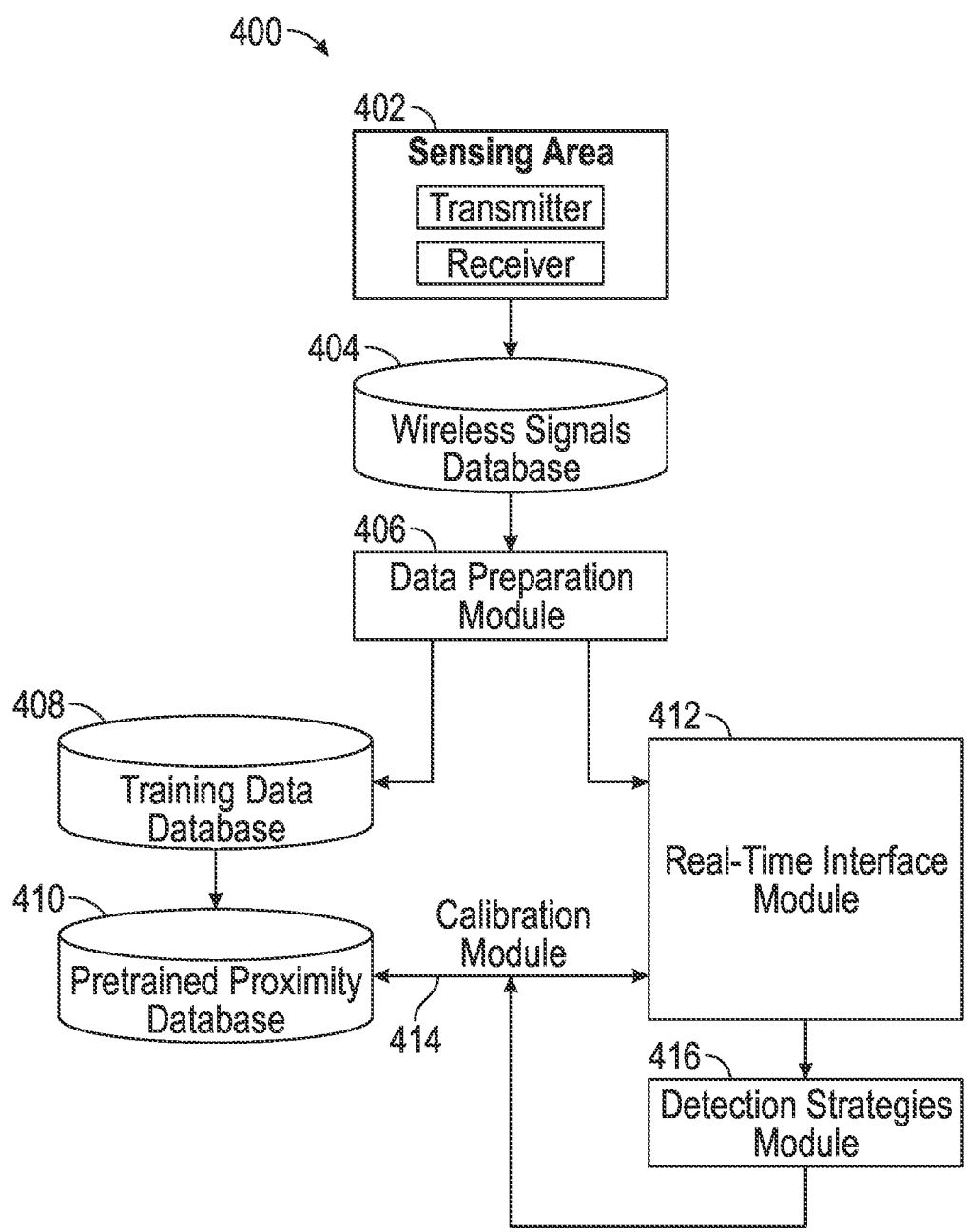
Figure 5:
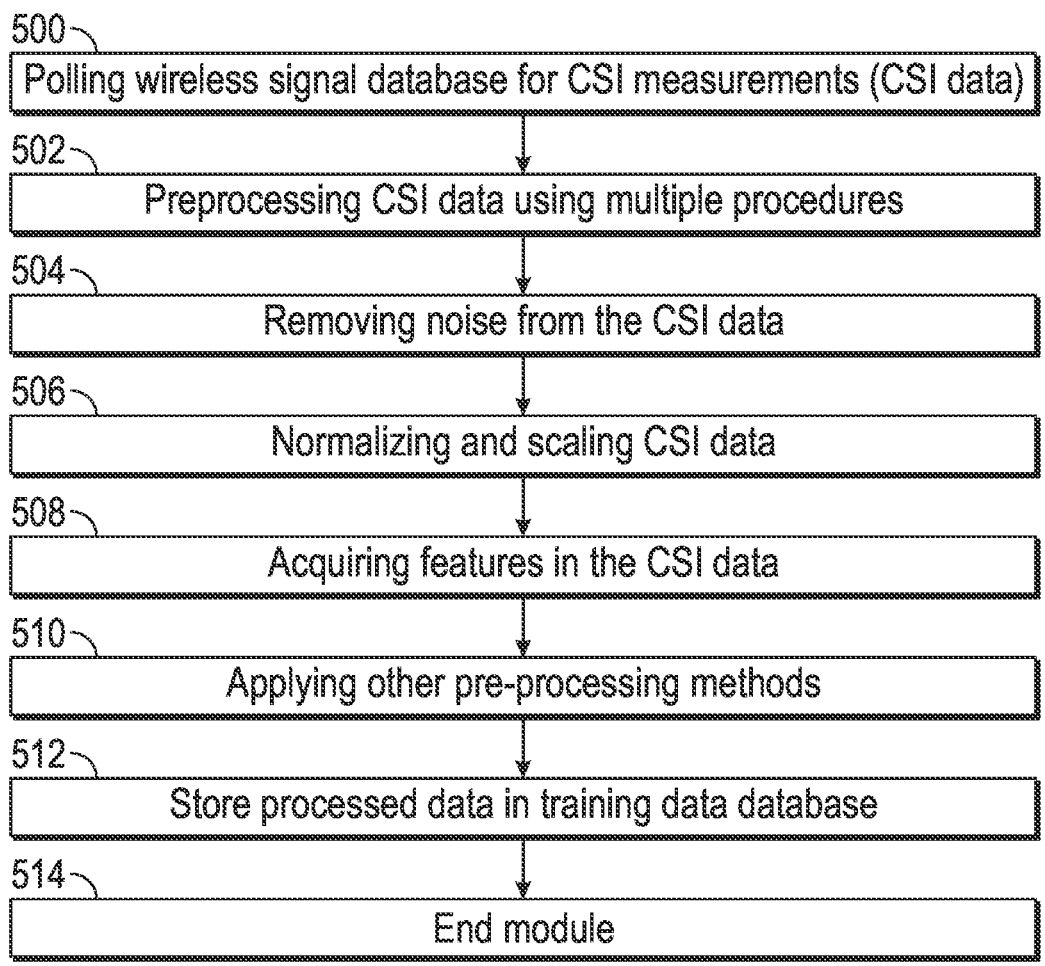
Figure 8:
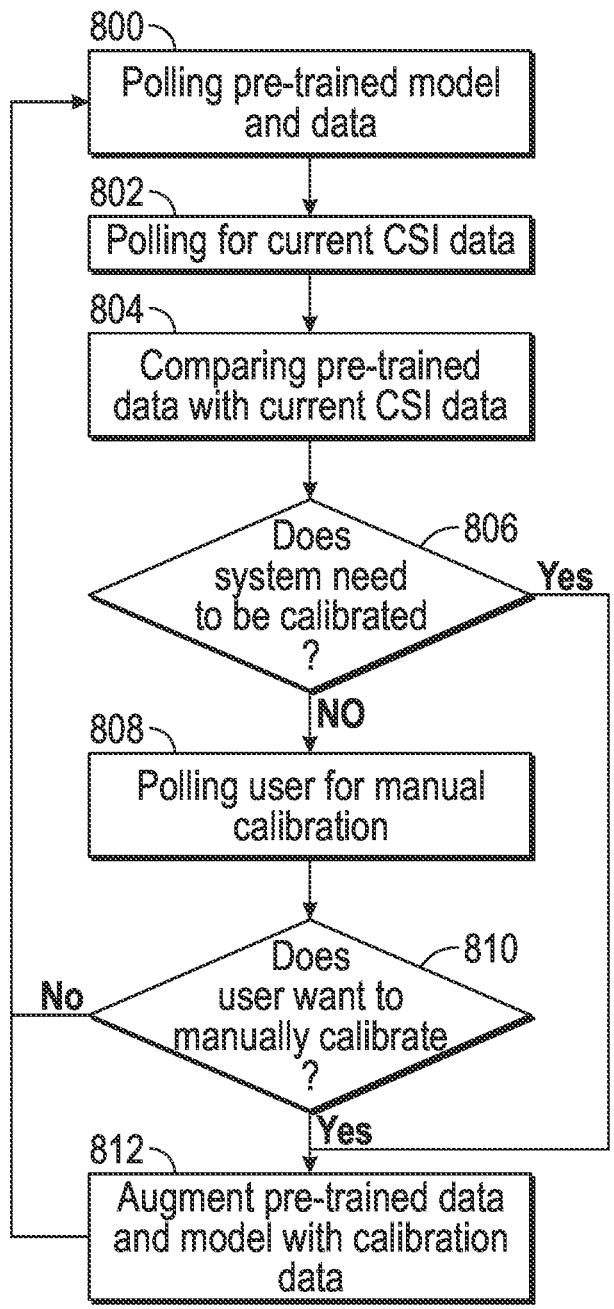
Figure 9:
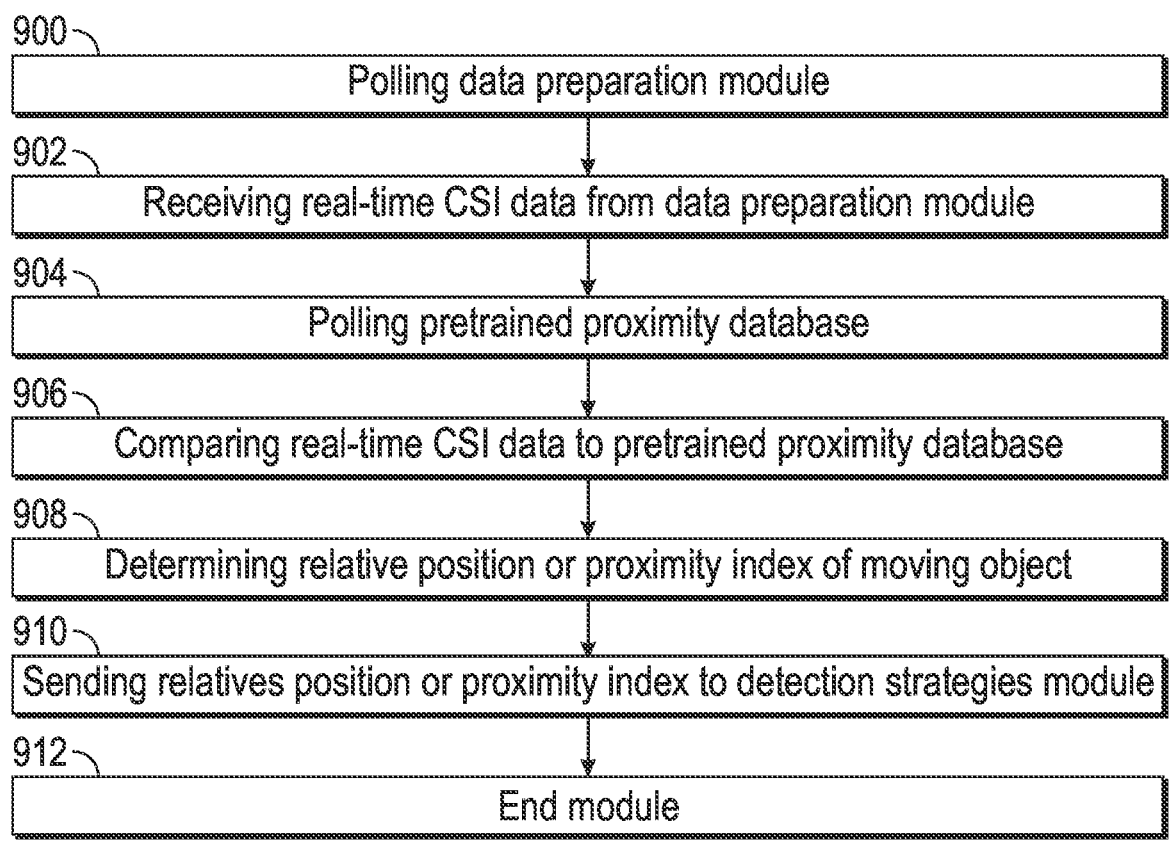
Figure 10:
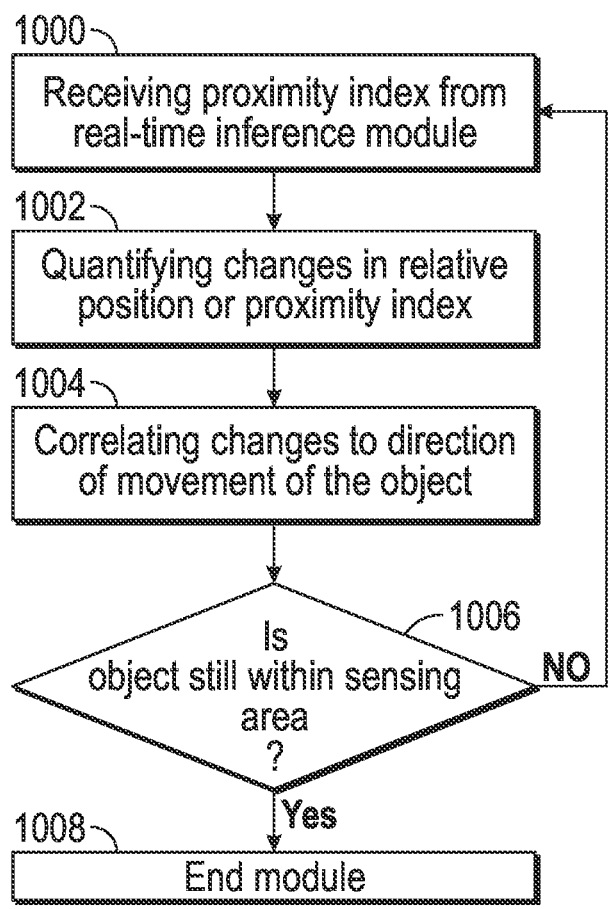
Figure 11A:
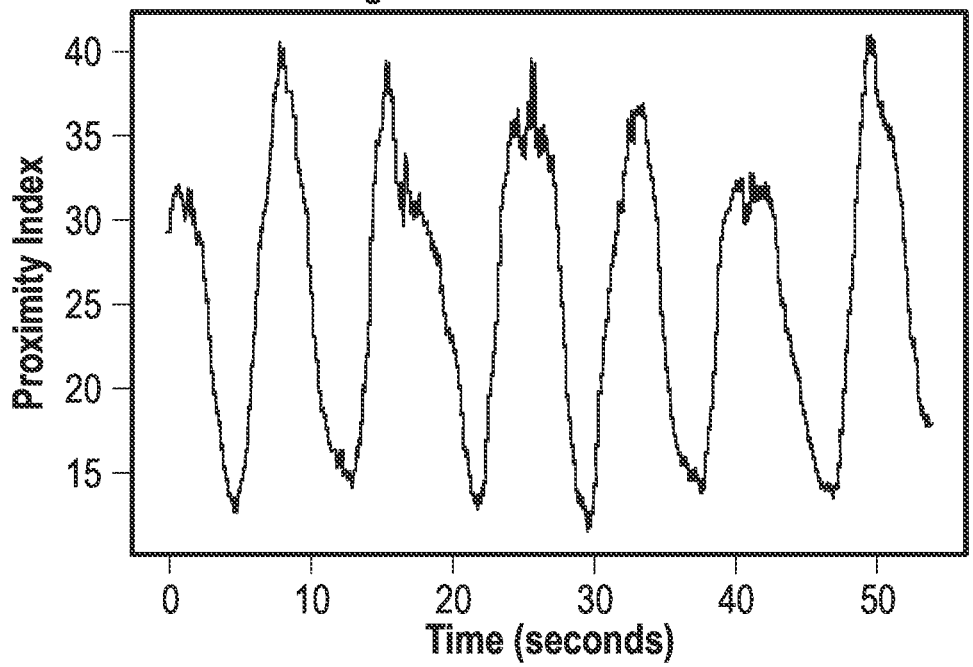
Figure 11B:
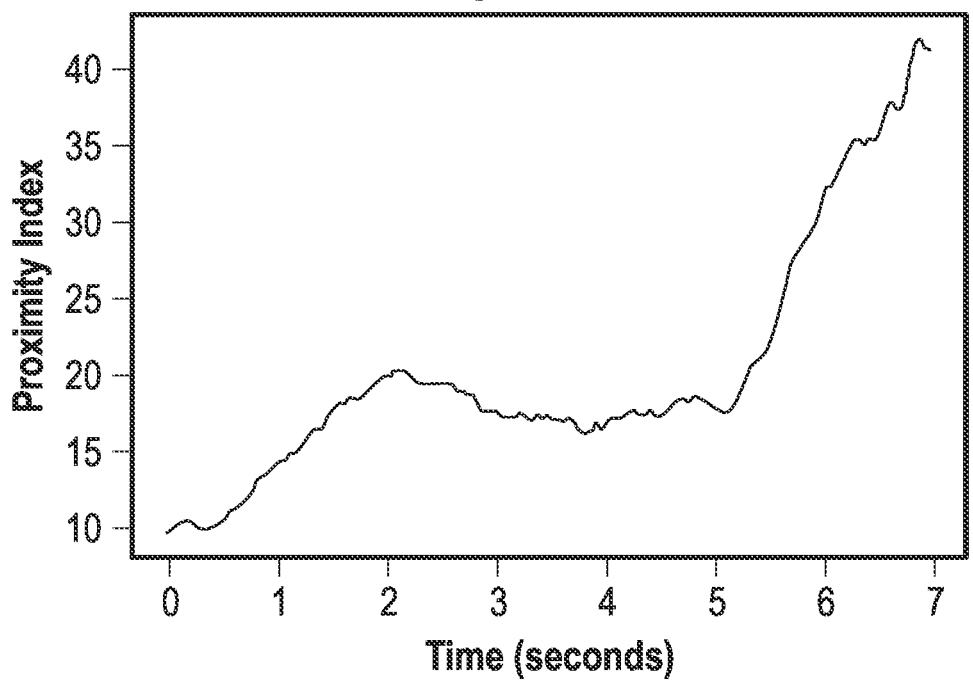
Figure 11C:
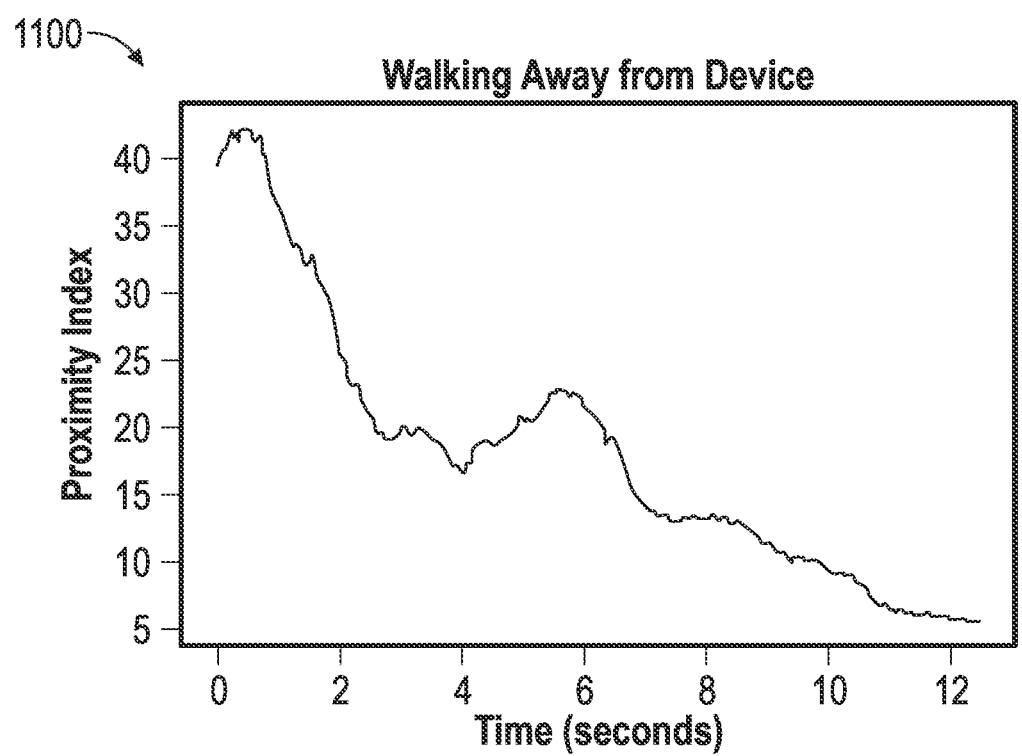

FIG. 1 illustrates an exemplary wireless intelligent motion and presence detection system.
FIG. 2 illustrates an exemplary sensing area.
FIG. 3 illustrates exemplary device placement.
FIG. 4 illustrates an exemplary intelligent motion system.
FIG. 5 is a flowchart illustrating an exemplary method for data preparation.
FIG. 6 illustrates an exemplary training data database.
FIG. 7 illustrates an exemplary pre-trained proximity database.
FIG. 8 is a flowchart illustrating an exemplary method for calibration.
FIG. 9 is a flowchart illustrating an exemplary method for real-time inference.
FIG. 10 is a flowchart illustrating an exemplary method for detection strategies.
FIG. 11a-c illustrates exemplary proximity indices.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

FIG. 1 illustrates an exemplary wireless intelligent motion and presence detection system. The system includes a wireless access point 102 that may be a Wi-Fi access point. In an embodiment, the wireless access point 102 is an IEEE 802.11n or 802.11ac or above access point. The wireless transceiver of the wireless access point 102 is in communication with a further stationary device over at least one radio frequency communication link. The wireless access point 102 is configured to record a further channel state, frequency response or impulse response information data set for the at least one radio frequency communication link at a corresponding time. In an embodiment, determining the activity of the person in the environment includes determining the activity of the person in the environment based on a comparison of the further channel state information, frequency response or impulse response of the channel data set to each of the at least one channel state information, or frequency or impulse response of the channel profiles of each of the plurality of activity profiles. In an embodiment, the activity is determined based on a sum of a similarity measurement of the channel state information, or impulse or frequency response of the channel data set and a similarity measurement of the further channel state information, or impulse or frequency response of the channel data set.

A central processing unit (CPU) 104 is the electronic circuitry within a computer that carries out the instructions of a computer program by performing the basic arithmetic, logic, controlling and input/output (I/O) operations specified by the instructions. A graphics processing unit (GPU) 106 is a specialized electronic circuit designed to rapidly manipulate and alter memory to accelerate the creation of images in a frame buffer intended for output to a display device. GPUs 106 are used in embedded systems, mobile phones, personal computers, workstations, and game consoles. Modern GPUs 106 are very efficient at manipulating computer graphics and image processing. GPUs 106 have a highly parallel structure that makes them more efficient than general-purpose CPUs 104 for algorithms that process large blocks of data in parallel. A digital signal processor (DSP) 108 is a specialized microprocessor (or a SIP block), with its architecture optimized for the operational needs of digital signal processing. The DSP 108 measures, filters or compresses continuous real-world analog signals. An application program interface (API) 110 is a set of routines, protocols, and tools for building software applications. API 110 specifies how software components should interact. Additionally, APIs 110 are used when programming graphical user interface (GUI) components. The API 110 provides access to the channel state data to the agent. A wireless access point 102 compliant with either 802.11ac or 802.11n or above access point, allows a device to have multiple radio 112 antennas. Multiple radio 112 antennas enable the equipment to focus on the far end device, reducing interference in other directions, and giving a stronger useful signal. This greatly increases range and network speed without exceeding the legal power limits.

An agent 114 is configured to collect data from the Wi-Fi chipset, filter the incoming data then feed and pass it to the cloud for activity identification. Depending on the configuration, the activity identification can be done on the edge, at the agent level, or in the cloud, or some combination of the two. A local profile database 116 is utilized when at least a portion of the activity identification is done on the edge. This could be a simple motion/no-motion determination profile, or a plurality of profiles for identifying activities, objects, individuals, biometrics, etc. An activity identification module 118 distinguishes between walking activities and in-place activities. In general, a walking activity causes significant pattern changes of the CSI, or impulse or frequency response of the channel amplitude over time, since it involves significant body movements and location changes. In contrast, an in-place activity (e.g., watching TV on a sofa) only involves relative smaller body movements that will be captured through small distortions on magnitude and/or of CSI.

The sensing area 120 may contain a plurality of transmitters 122. In electronics and telecommunications, a transmitter 122 or radio transmitter is an electronic device, which produces radio waves with an antenna. The transmitter 122 itself generates a radio frequency alternating current, which is applied to the antenna. When excited by this alternating current, the antenna radiates radio waves. There can be a plurality of receivers 124 within the sensing area 120. In radio communications, a radio receiver, also known as a receiver 124, is an electronic device that receives radio waves and converts the information carried by them to a usable form. The receiver 124 is used with an antenna. The antenna intercepts radio waves (i.e., electromagnetic waves) and converts them to tiny alternating currents which are applied to the receiver, and the receiver extracts the desired information. The receiver 124 uses electronic filters to separate the desired radio frequency signal from all the other signals picked up by the antenna, an electronic amplifier to increase the power of the signal for further processing, and finally recovers the desired information through demodulation. The information produced by the receiver 124 may be in the form of sound, moving images (television), or data. A receiver 124 may be a separate piece of electronic equipment, or an electronic circuit within another device.

After device placement 126, a short period of initial calibration is performed by asking the user to walk through one or more sub-regions within the space (e.g., near the device) and record the location labels. A capture from the empty apartment is used as reference. The user may interact with the system through a user interface, which can be accessed from any Wi-Fi-enabled device such as a computer or a portable device such as tablet or smartphone. Once the initial calibration is over, the real-time localization system is activated, and the user is able to track the location of a moving person within the apartment.

In an embodiment, a wireless intelligent motion and presence detection system 128 includes a wireless signal database 130. The wireless signal database 130 contains the raw signal data that is collected from the sensing area 120. This includes receiving raw signal data from any number of transmitters 122 or receivers 124. The data preparation module 132 is followed by the proposed localization system, where machine learning and decision-making techniques are used to infer the location of the moving target within the sensing area 120. The localization process initiates by transforming a set of pre-recorded CSI data from initial training data with the help of data preparation output, to form a training data pool. The training data database 134 is generated by creating feature tables from pre-recorded CSI data from a test environment. CSI data was recorded for empty captures as well as captures for human presence in different parts of the test environment. The offline training process includes an unsupervised learning method which is fitted with training data database to generate the pre-trained proximity database 136. After building the trained model, there is a calibration process 138 that needs to be done before real-time inference on the streaming data. As the trained model is fitted with pre-recorded data from test environments, the system needs to be calibrated to the sensing area 120 in question (e.g., user's apartment)

Calibration feedback includes drifts or unwanted changes in the distribution of input data expected over a long-term usage of the CSI-based localization systems. Therefore, the positioning model that is learned from the pre-trained model and initial calibration, may need to be updated over the lifetime of the system. Hence there is a calibration module 138 for recalibrating the system in case of deteriorating performance of the system. The data collected during recalibration can be used to augment the pre-recorded training data pool, and then to improve the pre-trained probabilistic model. The user is asked to collect some data while being present in different parts of the sensing area and label the recorded data accordingly. Alternatively, an autocalibration process may be applied, where the automatic captures of environment are taken while the sensing area is empty and/or occupied, and these captures are used to calibrate the model for the intended environment. In the real-time inference module 140, the relative position or proximity index of a moving participant within the sensing area 120 is estimated using the pre-trained model and real-time streaming data obtained from the data preparation module 132. The real-time proximity index generated at module is further processed to infer more quantified positioning status of a moving user inside sensing area, including but not limited to approaching a reference device and walking away from a reference device.

The detection strategies module 142 includes methods that track and quantify these changes and beside the room-level position of the moving user, will determine the direction of their movement toward or away from the device(s). The role of this module is to receive a buffer of labels from proximity prediction and apply several strategies to output a stable location status. The following includes examples of strategies that can be applied to deliver application use cases such as proximity-based room-level positioning and proximity direction estimation (e.g., identifying approaching towards or moving away from a fixed device location). In one example, the room-level localization is considered as a kclass classification problem, where for each time frame W (t) a class label c_t is independently obtained from the base learner with confidence scores (prediction probability) of c_p. Considering a decision frame W≥W with length w', where given a prediction history, {c_((t−w'+1)), • • •, c_((t−1)), c_t} and {p_((t−w'+1)), . . . , p_((t−1)), p_t, a final class decision C_T is made for time buffer T={t−w'+1, • • •, t−1, t} through several steps, such as majority voting and confidence-based voting. In another example, while a moving subject is walking inside the sensing area, quantifying the changes in the proximity index can be correlated to the direction of the moving subject, either toward or away from the position of the fixed device(s). Therefore, increasing and decreasing proximity index can be interpreted as the direction of proximity change.

Detection strategies module 142 includes methods that track and quantify these changes and beside the room-level position of the moving user, will determine the direction of their movement toward or away from the device(s). A typical proximity index 144 is calculated while a human subject is walking in different patterns near the wireless device. Examples of a typical proximity index 144 in different patterns are while a human user is a) walking in a circular pattern in the room near receiver device, b) approaching toward and c) walking away from the receiver device. A cloud 146 analyzes and creates profiles describing various activities. A profile database 148 that is utilized when at least a portion of the activity identification is done in the cloud 146. This could be a simple motion/no-motion determination profile, or a plurality of profiles for identifying activities, objects, individuals, biometrics, etc. A device database 150 stores the device IDs of all connected wireless access points. A profile module 152 monitors the data set resulting from continuous monitoring of a target environment, to identify multiple similar instances of an activity without a matching profile in such a data set, combine that data with user feedback to label the resulting clusters to define new profiles that are then added to the profile database 148.

FIG. 2 illustrates an exemplary sensing area 200. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The system includes a plurality of wireless devices associated with a predetermined region of a property (i.e., sensing area 200) operating according to a common wireless standard, wherein metrics extracted from the wireless signals transmitted and received by the plurality of wireless devices may be used to sense and quantify the location and position of human physical movements within the sensing area. The figure depicts an exemplary schematic representation of signal propagation between the antennas (1) to (n) in transmitter 202 to the antennas (1) to (m) in the receiver 204. There is a direct path between each of the transmitter 202 antennas and each of the receiver 204 antennas and a multipath component 206 for each of those direct path links. The wireless signals generate what we refer to as the sensing area, in which any human, and or pets, and or moving objects will distort the propagating signals (e.g., CSI measurements). In the system, common wireless devices are used as passive sensing infrastructure to create smart indoor environments and, therefore, an intelligent proximity-based tracking and/or positioning method for indoor environments.

FIG. 3 illustrates exemplary device placement 300, which may be within a residential apartment and its corresponding sub-regions assignments as illustrated. The real-time framework aims to discover the location of a human target within a sensing area either through distance indicator or at sub-region level, by continuously collecting wireless signals and applying several analytic and modeling procedures to infer correlation between obtained measurements and the distance of the movements with respect to fixed wireless device position(s). A sub-region within a sensing area is defined as any smaller division or subdivision of a larger indoor area, which may or may not also align with the room boundaries within the property (e.g., bedroom, living room and dining room).

FIG. 4 illustrates an exemplary intelligent motion system. A system overview of the proximity-based positioning system according to various embodiments is depicted in FIG. 4. The intelligent motion system 400 offers robust long-term localization that operates in two phases (offline and real-time). For both phases, the raw wireless signals collected from sensing area 402, are transferred to a wireless signals database 404 then processed by a data preparation module 406. During the offline process, a set of pre-recorded wireless data is stored inside a data repository or training data database 408, which includes captures from empty or/and occupied indoor environments to train a probabilistic proximity model for position identification. Furthermore, the process of building the probabilistic model yields in a pre-trained proximity database 410. In the real-time inference module 412, the relative position or proximity index of a moving object within the sensing area 402 is estimated using the pre-trained proximity database 410 and real-time streaming data is obtained from the data preparation module 406. The real-time interference module 412 is further processed to infer more quantified positioning status of a moving user inside sensing area, including but not limited to approaching a reference device and walking away from a reference device.

The system 400 also includes a feedback mechanism, calibration module 414, that includes a method for re-calibrating the system in case of deteriorating performance of the system and/or while a changed in the location of the fixed reference device is detected. The data collected while calibration is used to augment the pre-recorded data, and then to improve the pre-trained probabilistic model. The detection strategies module 416 includes methods that track and quantify these changes and beside the room-level position of the moving user, will determine the direction of their movement toward or away from the device(s). The role of this module is to receive a buffer of labels from proximity prediction and apply several strategies to output a stable location status.

Referring to the sensing area 402, considering sensing area 402 created by at least one sensing module, let $1 \in \{1, \cdots, L\}$ denote the antenna links between transmitter 202 and receiver 204, where $L=n \times m$, and $[CSI]\_il$ (t) denote a complex number describing the signal received at subcarrier $i \in \{1, \cdots, I\}$ at time t, which is defined by:

$[CSI]il = 1[CSI]\_il |e^{(-j \sin[\angle[(CSI)]\_il])}$ where $[CSIz,2\_il|$ and $\angle[CSI]\_il$ denote the amplitude response and the phase response of subcarrier i of link 1, respectively. The total number of subcarriers i per link depends on the physical property of the hardware device used for collecting CSI values and is fixed for all links. Environmental changes and human body movements affect the CSI values of different links independently but affect the different subcarriers of each link in a similar manner.

As mentioned supra, the collected CSI measurements are constantly transformed from the sensing device to a data preparation module, where multiple preprocessing procedures are applied to the data streams to eliminate or tame redundant and noisy samples, enhance the raw input for further analysis, and to extract and/or generate discriminative features that precisely reflect distinguishable properties of different sub-regions within the sensing area 402. The data preparation module 406 includes, but is not limited to, noise removal, normalization, and feature acquisition units.

FIG. 5 is a flowchart illustrating an exemplary method for data preparation. The method begins, at step 500, with the data preparation module polling the wireless signal database for new CSI measurements that have that been processed. At step 502, the received CSI measurements from the wireless signal database are preprocessed using multiple preprocessing procedures which are applied to the CSI data streams to eliminate or tame redundant and noisy samples, enhance the raw input for further analysis, and extract and/or generate discriminative features that precisely reflect distinguishable properties of different sub-regions within the sensing area. This includes, but not limited to, noise removal, normalization, and feature acquisition. The raw data contains high-frequency noise from a variety of internal and surrounding sources.

At step 504, the noise removal process is applied to the CSI data. The mobility and other physical activities of human or any moving target within indoor spaces happen at different but predictable range of frequencies. A set of digital filters targeting specific frequency bands collect information about different target moving activities, such as human walks or pet movement. As a working example, duration of typical human walks happens at low frequency, no more than 2 Hz, thus a low-pass filter with cut-off frequency of 2 Hz can be applied to each CSI stream individually, in order to remove the high-frequency noise as well as the static components. The normalization and scaling process is another example of the many different ways CSI data can be preprocessed. At each time stamp t, multiple CSIs values for different transmitter-receiver links can take values in different dynamic ranges, while the values of different subcarriers within each link can get shifted and scaled over time. At step 506, these irrelevant and unwanted variations can be removed by introducing a fixed-score scaling normalization module, which standardizes the CSI feature space to a predefined reference range, allowing variations in the signals to be reliably tracked. The L2-norm of the CSI vector was calculated for each link to rescale all values to the reference range. The feature acquisition process is one more example of a process for preprocessing CSI data. CSI data can be obtained from the network interface controller (NIC) in terms of packets of data for different time instances. Each packet of data contains CSI magnitude and phase data for different streams and spread over different subcarriers. The number of streams and number of subcarriers is dependent on the hardware used and the operating bandwidth. For example, a 4 antennae transmitter and 4 antennae receiver pair will result in 16 streams of data. Typical values for number of subcarriers operation in 40 MHx and 80 MHz bandwidths are 56 or 122, respectively.

The variations of the CSI data of the same subcarrier in different links are not very similar. CSI data from multiple streams are used for feature extraction. To reduce computational cost, data from all available streams might not be used. For example, the 1st, 6th, 11th, and 16th stream can be chosen from available 16 streams to represent adequate variability of the data while keeping the computational costs reasonable. The number of streams to be selected and the choice of streams can be further optimized based of some empirical parameters.

In one example, the CSI magnitude data is used from different subcarriers to build the proximity model. In some cases, all available subcarrier data might be used. For example, for the hardware using 56 subcarriers, all 56 subcarriers data are used for feature extraction. A subset of the subcarriers might also be selected to keep parity between a number of features extracted from data from different hardware sources. For example, for the case of 122 subcarriers, every other subcarrier is chosen starting from the first subcarrier until 56 subcarriers are selected. Skipping adjacent subcarriers should not result in significant information loss, as correlation between adjacent subcarriers (e.g., in the same stream) are pretty high compared to correlation between subcarriers further apart in frequency.

Statistical measures are computed on the CSI magnitude data from a given "observation window." The length of the observation window is chosen so as to reflect a significant amount of time to represent some human motion/activity/presence. For example, length of the observation window can be chosen to be 50 packets long, roughly corresponding to 2.5 seconds of captured data (approximate rate is 20 packets per second).

The feature acquisition module begins by sliding a moving window with overlap over the stream of samples, in order to extract correlated features that describe the location of environmental events. This creates a vector of the form:

$$W(t) = \{CSIil(t-w+1), \cdots, CSIil(t-1), CSIil(t)\}$$

where w is the size of the moving window and t is the time stamp of the CSI values of subcarrier i of link 1. As introduced supra, complex values CSIl can be presented by their amplitude information |CSIil|, and phase information $\angle CSIil$. At step 508, this data is used to extract/generate a new feature space with the fusion of multiple domain information including, but not limited to, time-domain or temporal amplitude information, and frequency amplitude information.

Temporal amplitude information: Statistics computed over time from per-subcarrier CSI amplitudes, are the most widely used features in CSI-base systems, since they exhibit more temporal stability.

Frequency amplitude information: Various CSI amplitudes for different subcarriers of each Rx-Tx link describe channel properties in the CSI frequency domain (subcarrier space) and a moving subject can change signal reflections differently based on his or her location. This results in different delay profiles, where the frequency information is embedded in the correlations among (CSI values of) subcarriers in each Rx-Tx link.

For both temporal amplitude information and frequency amplitude information schemes, features are inferred by computing statistics within each moving window $W\_1$ (t) that include, but are not limited to, standard deviation, skewness, kurtosis, interquartile range, and median absolute deviation.

Standard deviation (SD) is a measure that is used to quantify the amount of variation or dispersion of a set of data values. A low standard deviation indicates that the data points tend to be close to the mean value of the set, while a high standard deviation indicates that the data points are spread out over a wider range of values.

Skewness is a measure of the asymmetry of the probability distribution of a real-valued random variable about its mean. The skewness value can be positive or negative, or undefined. For a unimodal distribution, negative skew commonly indicates that the tail is on the left side of the distribution, and positive skew indicates that the tail is on the right.

Kurtosis is a measure of the tailedness of the probability distribution of a real-valued random variable. In a similar way to the concept of skewness, kurtosis is a descriptor of the shape of a probability distribution.

The interquartile range (IQR) is a measure of statistical dispersion, being equal to the difference between 75th and 25th percentiles. In other words, the IQR is the first quartile subtracted from the third quartile. It is a trimmed estimator, defined as the 25% trimmed range, and is a commonly used robust measure of scale. Unlike total range, the interquartile range has a breakdown point of 25%, and is thus often preferred to the total range.

The median absolute deviation (MAD) is a robust measure of the variability of a univariate sample of quantitative data. For a univariate data set, the MAD is defined as the median of the absolute deviations from the data's median, such as starting with the residuals (deviations) from the data's median, the MAD is the median of their absolute values.

The MAD is a measure of statistical dispersion, and it is a robust statistic, being more resilient to outliers in a data set than the standard deviation. In the standard deviation, the distances from the mean are squared, so large deviations are weighted more heavily, and thus outliers can heavily influence it. In the MAD, the deviations of a small number of outliers are irrelevant.

The set of features are extracted by calculating statistical measures on CSI magnitude data from the moving window, considering the set of selected subcarriers and selected streams. At step 510, a feature set for each moving window from a particular dataset gives rise to a feature table for that particular dataset. At step 512, the post-processed data is sent and stored in the training data database. At step 514, the preprocessing of the CSI data is complete and the module ends.

FIG. 6 illustrates an exemplary training data database. The training data database contains pre-recorded CSI data from a test environment. The training data database is generated by creating feature tables from pre-recorded CSI data from a test environment. CSI data was recorded for empty captures as well as captures for human presence in different parts of the test environment. During the offline process, a set of pre-recorded wireless data is stored inside a data repository (e.g., training data database), which includes captures from empty or/and occupied indoor environments to train a probabilistic proximity model for position identification. The training data database includes a wide range of specimen data and by extension, specimen feature values, so that the PCA model is able to generalize.

FIG. 7 illustrates an exemplary pre-trained proximity database. The pre-trained proximity database contains proximity index data in different patterns. FIG. 7 depicts examples of proximity index data in different patterns while a human user is a) walking in a circular pattern in the room near receiver device, b) approaching toward and c) walking away from the receiver device, respectively, within an intelligent security system.

FIG. 8 is a flowchart illustrating an exemplary method for calibration. The method begins at step 800 with the polling of the pre-trained proximity database 136. At step 802, current CSI data is polled from the data preparation module 132. At step 804, the two sets of data are then compared to determine if there has been any deterioration of performance due to drifts or unwanted changes in the distribution of input data. At step 806, if there is a positional change of device within the environment the system would have to be recalibrated, this could be done automatically or manually. If no calibration is needed, there still could be a manual need that the user may see that the system did. If calibration is needed, the system is calibrated. If the system doesn't need to be calibrated, a user can manually initiate a calibration. At step 808, a user may initiate a calibration if they see that data is off or if they move a device (i.e., transmitter) which would cause inaccuracies in the CSI data. At step 810, if no manual calibration is detected the system returns to polling the pre-trained data. If a calibration is needed the system, at step 812, then goes into a learning mode to augment the current pre-trained proximity data and model by using the similar techniques used to pre-train model initially. Once the calibration is done the system initiates the real-time inference module and then returns to monitoring the system.

FIG. 9 is a flowchart illustrating an exemplary method for real-time inference. The method begins at step 900 with the polling of the data preparation module to get real-time CSI data from the sensing area. At step 902, the real-time CSI data is received at the real-time inference module. At step 904, the pre-trained proximity database or model is the polled. At step 906, the real-time CSI data is compared to the pre-trained proximity database or model. The real-time CSI data should match, with relative margin of error, to data in the pre-trained proximity database from which an estimated position or proximity is determined. At step 908, the relative position or proximity index of a moving participant within the sensing area is estimated using the pre-trained model and real-time streaming data obtained from module data preparation. At step 910, the proximity index or relative position of the participant is then sent to the detection strategies module. At step 912, the module ends.

FIG. 10 is a flowchart illustrating an exemplary method for detection strategies. The method begins at step 1000 with the proximity index or relative position being received from the real-time inference module. At step 1002, the proximity index is quantified. The index can be quantified using any number of methods. One example is quantifying the index based on coordinates mapped to the different relative positions or proximity index. At step 1004, the quantified index is then correlated to direction and movement. Therefore, increasing and decreasing proximity index can be interpreted as the direction of proximity change. Referring to detection strategies module includes methods that track and quantify these changes and beside the room-level position of the moving user, will determine the direction of their movement toward or away from the device(s). The quantified proximity index can be stored in the pre-trained proximity database with the corresponding data that would represent the location and direction of that object in the sensing area. At step 1006, as long as the object can be detected with in the sensing area the detection strategies module will continually receive a proximity index from the real-time inference module. At step 1008, the object has moved outside of the sensing area and the module ends.

FIG. 11a-c illustrates exemplary proximity indices. A typical proximity index 1100 is calculated while a human subject is walking in different patterns near the wireless device. Examples of proximity index in different patterns includes a) walking in a circular pattern in the room near receiver device, b) approaching toward and c) walking away from the receiver device, respectively, within an intelligent security system.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for locating a user, the method comprising:
storing data from a plurality of sensing devices in a wireless signal database, each of the plurality of sensing devices located within a sensing area;
polling the wireless signal database for new wireless signal data;
applying a plurality of filters to the new wireless signal data;
storing the filtered wireless signal data in a training data database;
polling a pre-trained proximity database that stores proximity index data;
adjusting the pre-trained proximity database based on shifts detected in the wireless signal data over time;
comparing the new wireless signal data with the proximity index data to determine a current location of a user within the sensing area;
quantifying the proximity index data based on coordinates mapped to the proximity index data;
correlating the quantified proximity index data to movement; and
storing the quantified proximity index data in the pre-trained proximity database.

2. A system for locating a user, the system comprising:
a plurality devices located within a sensing area;
a wireless signal database that stores raw wireless signal data from the plurality of devices;
a training data database that stores filtered wireless signal data;
a pre-trained proximity database that stores proximity index data,
a wireless communication interface that polls the wireless signal database for new wireless signal data and poll the pre-trained proximity database; and
a processor that executes instructions stored I memory, wherein the processor executes the instructions to:
apply a plurality of filters to the new wireless signal data,
adjust the pre-trained proximity database based on shifts detected in the wireless signal data over time, and
compare the new wireless signal data with the proximity index data to determine a current location of a user within the sensing area; wherein
the plurality of filters remove noise and normalize the wireless signal data;
the plurality of devices are transmitters and receivers;
the training data database stores feature tables from pre-recorded CSI data from a test environment.

3. The system according to claim 2, wherein the CSI data was recorded from empty captures and human presence detections in different parts of the test environment.

4. A method for locating a user, the method comprising:
storing data from a plurality of sensing devices in a wireless signal database, each of the plurality of sensing devices located within a sensing area;
polling the wireless signal database for new wireless signal data;
applying a plurality of filters to the new wireless signal data;
storing the filtered wireless signal data in a training data database;
polling a pre-trained proximity database that stores proximity index data;
adjusting the pre-trained proximity database based on shifts detected in the wireless signal data over time; and
comparing the new wireless signal data with the proximity index data to determine a current location of a user within the sensing area; wherein
the plurality of filters remove noise and normalize the wireless signal data;
the plurality of devices are transmitters and receivers;
the training data database includes feature tables from pre-recorded CSI data from a test environment.

5. The method according to claim 4, wherein
the pre-recorded CSI data was recorded for empty captures and human presence captures in different parts of the test environment.

* * * * *